(12) United States Patent
Westhues (10) Patent No.: US 9,763,087 B2
(45) Date of Patent: Sep. 12, 2017

(54) CRYPTOGRAPHIC KEY EXCHANGE OVER AN ELECTROSTATIC CHANNEL

(71) Applicant: MICROSOFT TECHNOLOGY LICENSING, LLC, Redmond, WA (US)

(72) Inventor: Jonathan Westhues, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 14/330,981

(22) Filed: Jul. 14, 2014

(65) Prior Publication Data

US 2016/0014598 A1 Jan. 14, 2016

(51) Int. Cl.
*H04L 9/00* (2006.01)
*H04W 12/04* (2009.01)
(Continued)

(52) U.S. Cl.
CPC ........ *H04W 12/04* (2013.01); *G06F 3/03545* (2013.01); *G06F 3/044* (2013.01);
(Continued)

(58) Field of Classification Search
CPC ... H04W 12/04; H04W 12/02; G06F 3/03545; G06F 3/0412; G06F 3/044; G06F 21/606;
(Continued)

(56) References Cited

U.S. PATENT DOCUMENTS 7,249,256 B2   7/2007   Hansen et al.
8,493,359 B2   7/2013   Wright et al.
(Continued)

FOREIGN PATENT DOCUMENTS

EP   2172834 A2   4/2010

OTHER PUBLICATIONS

Perlin, Ken., "Quikwriting: Continuous Stylus-based Text Entry", In Proceedings of the 11th annual ACM symposium on User interface software and technology, Nov. 1, 1998, 2 pages.
(Continued)

*Primary Examiner* — Linglan Edwards
*Assistant Examiner* — Forrest Carey
(74) *Attorney, Agent, or Firm* — Alleman Hall Creasman & Tuttle LLP (57) ABSTRACT

Various embodiments relating to exchanging a cryptographic key between a display device and an input device via electrostatic communication are disclosed. In one embodiment, an interactive communication device includes one or more electrodes and a radio transceiver. The one or more electrodes may be excited to capacitively couple with one or more electrodes of a proximate communication device so as to capacitively send a cryptographic key from the interactive communication device to the proximate communication device. The radio transceiver may be configured to communicate with a radio transceiver of the proximate communication device via a radio channel. The interactive communication device may be configured to subsequently exchange encrypted communications with the proximate communication device over the radio channel. The encrypted communications may be encrypted using the cryptographic key.

20 Claims, 6 Drawing Sheets

(51) Int. Cl.
| | |
|---|---|
| *G06F 3/041* | (2006.01) |
| *G06F 3/044* | (2006.01) |
| *G06F 3/0354* | (2013.01) |
| *H04L 9/08* | (2006.01) |
| *H04W 12/02* | (2009.01) |
| *G06F 21/60* | (2013.01) |
| *G06F 21/83* | (2013.01) |
| *G06F 21/84* | (2013.01) |

(52) U.S. Cl.
CPC .............. *G06F 3/0412* (2013.01); *H04L 9/08* (2013.01); *G06F 21/606* (2013.01); *G06F 21/83* (2013.01); *G06F 21/84* (2013.01); *H04W 12/02* (2013.01)

(58) Field of Classification Search
CPC . G06F 21/83; G06F 21/84; H04L 9/08; H04L 9/0819; H04L 9/0827
See application file for complete search history.

(56) References Cited

U.S. PATENT DOCUMENTS

| | | | | |
|---|---|---|---|---|
| 2002/0095587 | A1* | 7/2002 | Doyle | ................. G06Q 20/341 713/186 |
| 2003/0197691 | A1* | 10/2003 | Fujiwara | ............. G06F 3/03545 345/179 |
| 2004/0023680 | A1 | 2/2004 | Hulvey | |
| 2004/0092231 | A1 | 5/2004 | Ayatsuka et al. | |
| 2004/0143730 | A1* | 7/2004 | Wen | ................... G06Q 20/3674 713/150 |
| 2005/0058292 | A1 | 3/2005 | Diorio et al. | |
| 2006/0138228 | A1 | 6/2006 | Sanders et al. | |
| 2006/0224048 | A1* | 10/2006 | Devaul | ................ A61B 5/0024 600/300 |
| 2007/0247445 | A1 | 10/2007 | Lynggaard et al. | |
| 2007/0293142 | A1* | 12/2007 | Dehmas | ............... G06K 7/0008 455/1 |
| 2010/0085325 | A1 | 4/2010 | King-Smith et al. | |
| 2010/0194547 | A1 | 8/2010 | Terrell et al. | |
| 2011/0007037 | A1 | 1/2011 | Ogawa | |
| 2011/0058674 | A1 | 3/2011 | Campbell et al. | |
| 2011/0304583 | A1* | 12/2011 | Kruglick | ................. G06F 3/044 345/174 |
| 2012/0013555 | A1 | 1/2012 | Maeda et al. | |
| 2012/0050207 | A1 | 3/2012 | Westhues et al. | |
| 2012/0050231 | A1 | 3/2012 | Westhues et al. | |
| 2012/0105361 | A1 | 5/2012 | Kremin et al. | |
| 2012/0105362 | A1 | 5/2012 | Kremin et al. | |
| 2012/0268414 | A1* | 10/2012 | Alameh | .............. G06F 3/03545 345/174 |
| 2012/0327041 | A1 | 12/2012 | Harley et al. | |
| 2013/0106717 | A1 | 5/2013 | Sundara-Rajan et al. | |
| 2013/0106719 | A1 | 5/2013 | Sundara-Rajan et al. | |
| 2013/0113725 | A1 | 5/2013 | Seo et al. | |
| 2013/0207926 | A1 | 8/2013 | Kremin et al. | |
| 2013/0207938 | A1 | 8/2013 | Ryshtun et al. | |
| 2013/0278550 | A1 | 10/2013 | Westhues | |
| 2013/0326495 | A1* | 12/2013 | Reunamaki | ............... G06F 8/65 717/173 |
| 2014/0028576 | A1 | 1/2014 | Shahparnia | |
| 2014/0134962 | A1 | 5/2014 | Huynh et al. | |
| 2014/0176495 | A1 | 6/2014 | Vlasov | |
| 2014/0267339 | A1* | 9/2014 | Dowd | .................... G06F 3/0414 345/581 |
| 2015/0363012 | A1* | 12/2015 | Sundara-Rajan | ........ G06F 3/038 345/179 |
| 2015/0373083 | A1* | 12/2015 | Geurts | ................. H04B 13/005 715/740 |

OTHER PUBLICATIONS

Westhues et al., U.S. Appl. No. 14/150,695, "Display System With Electrostatic and Radio Links", filed Jan. 8, 2014, 36 pages.
ISA European Patent Office, International Search Report and Written Opinion Issued in Application No. PCT/US2014/071330, Mar. 30, 2015, WIPO, 9 pages.
ISA European Patent Office, International Search Report and Written Opinion Issued in Application No. PCT/US2015/039629, Oct. 9, 2015, WIPO, 16 pages.
United States Patent and Trademark Office, Non-Final Rejection Received in U.S. Appl. No. 14/150,695, Jul. 1, 2015, 17 Pages.
IPEA European Patent Office, International Preliminary Report on Patentability Issued in Application No. PCT/US2015/039629, May 3, 2016, WIPO, 9 Pages.

* cited by examiner

FIG. 7

CRYPTOGRAPHIC KEY EXCHANGE OVER AN ELECTROSTATIC CHANNEL

DETAILED DESCRIPTION

Interactive displays have been developed that receive user input from styluses. In one type of implementation, each stylus is linked by a radio channel to the interactive display. When the stylus is placed near the interactive display the stylus can report its Y (or X) position to the interactive display via the radio channel. To ascertain the Y position, the stylus makes electrostatic measurements via an electrode at its tip. Correspondingly, electrodes of an electrode matrix of the interactive display may be sequentially driven in cycles. In particular, an excitation at a "transmitting" electrode (e.g., with a driven voltage) creates a capacitive coupling between that electrode and the "receiving" electrode which is detected at the receiving electrode typically as a detected current. A capacitance measurement derived from the detected current may indicate the Y position of the stylus. The passing of information between electrodes via the capacitive coupling may be referred to as an electrostatic channel.

Furthermore, through this electrostatic channel, the stylus and the interactive display can determine a precise shared sense of timing at which the voltage between the electrode tip and a row (or column) of the electrode matrix is driven high (or, in some cases, is driven low). In particular, the capacitive measurements made by the stylus may be reported over the radio channel to the interactive display, which, in combination with measurements made by electronics within the interactive display, can be used to ascertain the stylus's row and column position. The interactive display can process the input accordingly to display, for example, a GUI element such as a cursor at the reported location of the stylus.

Furthermore, the stylus and the interactive display may transmit information other than position information. For example, the interactive display may send the stylus an upgraded version of firmware. In one example, the upgraded version of firmware is sent via the radio channel. However, this approach may be susceptible to malicious behavior. For example, a malicious device could read the data sent over the radio channel. In another example, the malicious device could inject data in a manner indistinguishable from the data sent between the legitimate stylus and the interactive display. In one particular example, the malicious device could be used to write malicious firmware to the stylus that renders the stylus permanently nonfunctional, as a denial of service attack. In another example, malicious firmware may be used to track user input information provided via the stylus, as a form of spyware.

Accordingly, the present description relates to exchanging a cryptographic key between an interactive display and a stylus capacitively via electrostatic communication in order to secure subsequent communications between the interactive display and the stylus. In one implementation, an interactive display includes one or more electrodes and a radio transceiver. The one or more electrodes may be excited to capacitively couple with an electrode of a proximate stylus to communicate over an electrostatic channel. In particular, the electrostatic channel may be used to capacitively send a cryptographic key from the interactive display to the stylus. Subsequent communications may be encrypted using the cryptographic key. For example, the interactive display may be configured to subsequently exchange encrypted communications with the stylus over a radio channel formed between a radio transceiver of the interactive display and a radio transceiver of the stylus.

In another implementation, the stylus may capacitively send the cryptographic key to the interactive display via the electrostatic channel. By capacitively sending the cryptographic key via the electrostatic channel between the interactive display and the stylus, communications between the interactive display and the stylus may be less susceptible to malicious behavior relative to sending unsecure communications between the interactive display and the stylus via the radio channel.

Figure 1:
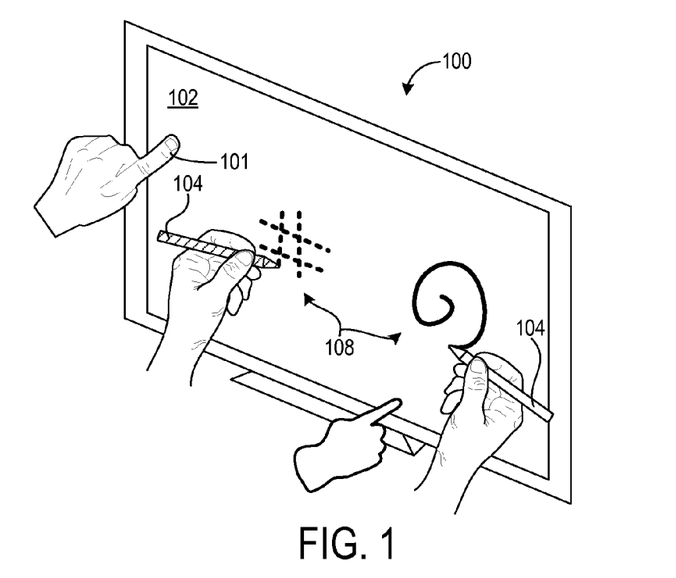
FIG. 1 shows an example interactive display system.

FIG. 1 shows an exemplary interactive display system 100. System 100 includes an interactive display 102 configured to concurrently sense input from multiple sources. For example, display 102 may sense touch input applied by human fingers 101 as well as input applied by one or more input devices. The input devices may be in the form of styluses 104, or may be configured in another suitable form factor. As shown and described in more detail below, appropriate graphical output 108 may be generated and displayed in response to the reception of input at interactive display 102.

Figure 2:
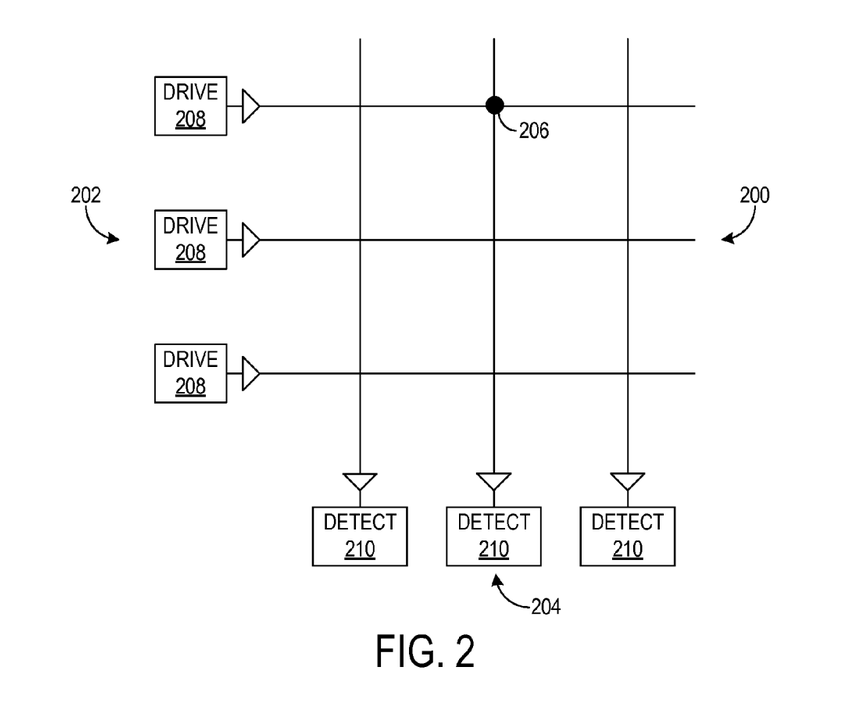
FIG. 2 shows an example electrode matrix of the interactive display system of FIG. 1.

FIG. 2 schematically shows an exemplary electrode matrix 200 that may be included in interactive display system 100 to facilitate input detection. Electrode matrix 200 may act as or be included in a touch sensor of the interactive display. Electrode matrix 200 includes a plurality of row electrodes 202 and a plurality of column electrodes 204 that are electrically insulated from one another. At each intersection in the matrix (e.g., node 206), a capacitance from a row electrode to a column electrode may exist. That capacitance may vary with touch position. Other capacitances, for example capacitance to an electrode in the tip of a stylus, may vary with the positions of other devices, for example that stylus.

The plurality of row electrodes 202 may be electrically coupled to respective drive circuits 208 configured to drive the row electrodes in various manners described below. Correspondingly, the plurality of column electrodes 204 may be electrically coupled to respective detect circuits 210 which may detect currents and/or voltages in the column electrodes resulting from the driving of the plurality of row electrodes 202, the application of voltages to display 102 by styluses 104, and/or the touch of fingers 101 to the display. In other implementations, however, detect circuits may instead be coupled to the plurality of row electrodes 202 with the plurality of column electrodes 204 being driven. The electrode matrix so constructed may be used to detect not only touch inputs from the finger of a user, but also to ascertain at least one coordinate of the position of an input device such as stylus 104, as described below. The number of rows and columns shown in FIG. 2 is for illustrative purposes only, and in a typical display many more columns and rows are included in electrode matrix 200 than are illustrated in FIG. 2.

Figure 3:
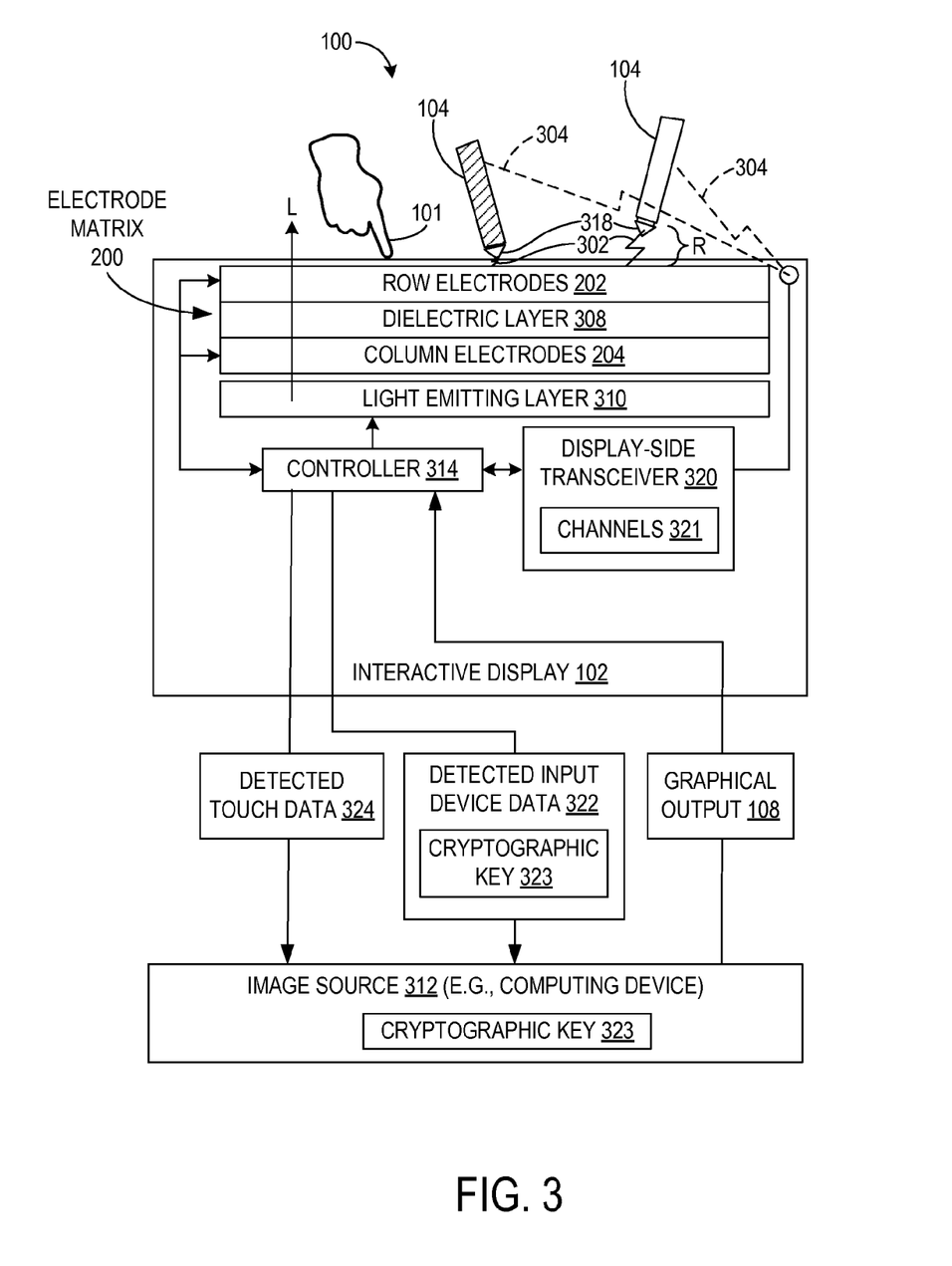
FIG. 3 shows example internal components of the interactive display system of FIG. 1.

Turning now to FIG. 3, a schematic diagram illustrating additional internal components of interactive display system 100 is shown. As shown, system 100 includes interactive display 102 which comprises the electrode matrix 200 described above having a plurality of row electrodes 202 positioned above (in a light emitting direction) a plurality of column electrodes 204. The plurality of row and column electrodes 202 and 204 are separated by a dielectric layer 308, which may be comprised of various suitable dielectric materials (e.g., glass, polyethylene terephthalate (PET), cyclic olefin polymer (COP) film, etc.). Positioned below electrode matrix 200 (relative to the light emitting direction) is a light emitting layer 310, which may be a liquid crystal display (LCD) stack, light-emitting diode (LED) stack, organic light emitting diode (OLED) stack, or a plasma display panel (PDP), for example. Light emitting layer 310 is configured to emit light L through electrode matrix 200 such that the light travels through a top surface of interactive display 102 and appears to a user as an image displayed on the top surface of the display. The light emitting layer 310 and electrode matrix 200 are operated under the control of a controller 314.

Interactive display system 100 further includes an image source 312, which may receive input in the form of detected touch data 324 and detected input device data 322 from electrode matrix 200 via controller 314, process the input at the image source 312, and generate appropriate graphical output 108 in response, which is sent back to the controller 314 for display via the light emitting layer 310 of interactive display 102. Image source 312 may be an external computing device, as shown, or a computing device integrated into the housing of the interactive display 102, and may include suitable programs, processors, and storage subsystems to carry out the functions described herein. An example computing device that may be used as image source 312 is described below with reference to FIG. 7.

To facilitate the establishment of communication channels (or links) between various styluses 104 and the interactive display 102, the interactive display 102 may communicate with proximate styluses 104 via respective electrostatic channels 302 established between electrode matrix 200 and the proximate styluses 104. In particular, the electrostatic channels 302 may be formed by a capacitive coupling between electrodes of matrix 200 and an electrode tip 318 of each stylus 104 when the electrode tip is positioned at a distance that is within a vertical range R from the plurality of row electrodes 202. R represents the range within which the capacitive coupling may be formed to send and receive information via the electrostatic channel. In some examples, R may be a range from 0 to 1 meter, from 0 to 20 centimeters, or from 0 to 5 centimeters. The system may be configured to utilize other suitable range values. As described below, a variety of types of information may be communicated via the electrostatic channel 302, including sending a cryptographic key used to subsequently send secure communications between the interactive display and the stylus.

In some implementations, two different unidirectional electrostatic channels having electric fields that vary in different ways with position, and that present a larger or smaller electric field at some distance (for example, three meters) from the interactive display may be used to capacitively communicate information between electrodes of proximate devices. A first electrostatic channel may be used to capacitively send information from electrodes of the interactive display to the stylus. In this first electrostatic channel, a size of the electric field may be dictated by the number of row electrodes in the electrode matrix that are excited to send the information to the stylus as well as the size of the electrodes. For example, the larger the display, the longer the row electrodes, and the larger the electric field. In some implementations, the electric field size of the first electrostatic channel may be reduced by exciting a subset of electrodes of the electric matrix relative to exciting all row electrodes of the electrode matrix. For example, the subset may be selected based on a detected position of the stylus. In one particular example, only the row electrode corresponding to the detected Y position of the stylus may be excited to form the capacitive coupling.

A second electrostatic channel may be used to send information from the electrode of the stylus to the electrode (s) of the interactive display. The electric field generated by the second electrostatic channel may be substantially smaller than the electrostatic field generated by the first electrostatic channel, because a single point electrode is being excited to form a capacitive coupling relative to an entire row or multiple rows being excited to form a capacitive coupling.

Note that the electric fields generated by the above described electrostatic channels may be substantially smaller than an electric field generated by a radio channel. In other words, the electrostatic channels may be more secure than the radio channels, because it may be more difficult for a malicious device to be positioned in a smaller eavesdropping range of the electrostatic channels. Moreover, the second electrostatic channel may be more secure than the first electrostatic channel, because it may be more difficult for a malicious device to be positioned in a smaller eavesdropping range of the second electrostatic channel. For example, the effective eavesdropping range of the radio channel may be 10-100 meters, the effective eavesdropping range of the second electrostatic may be 1-10 meters, and the effective eavesdropping range of the second electrostatic channel may be less than 1 meter. Note that the electrostatic channels and the radio channel may be designed to any suitable specification, but generally the electrostatic channels may have a smaller effective range than the radio channel.

Figure 5:
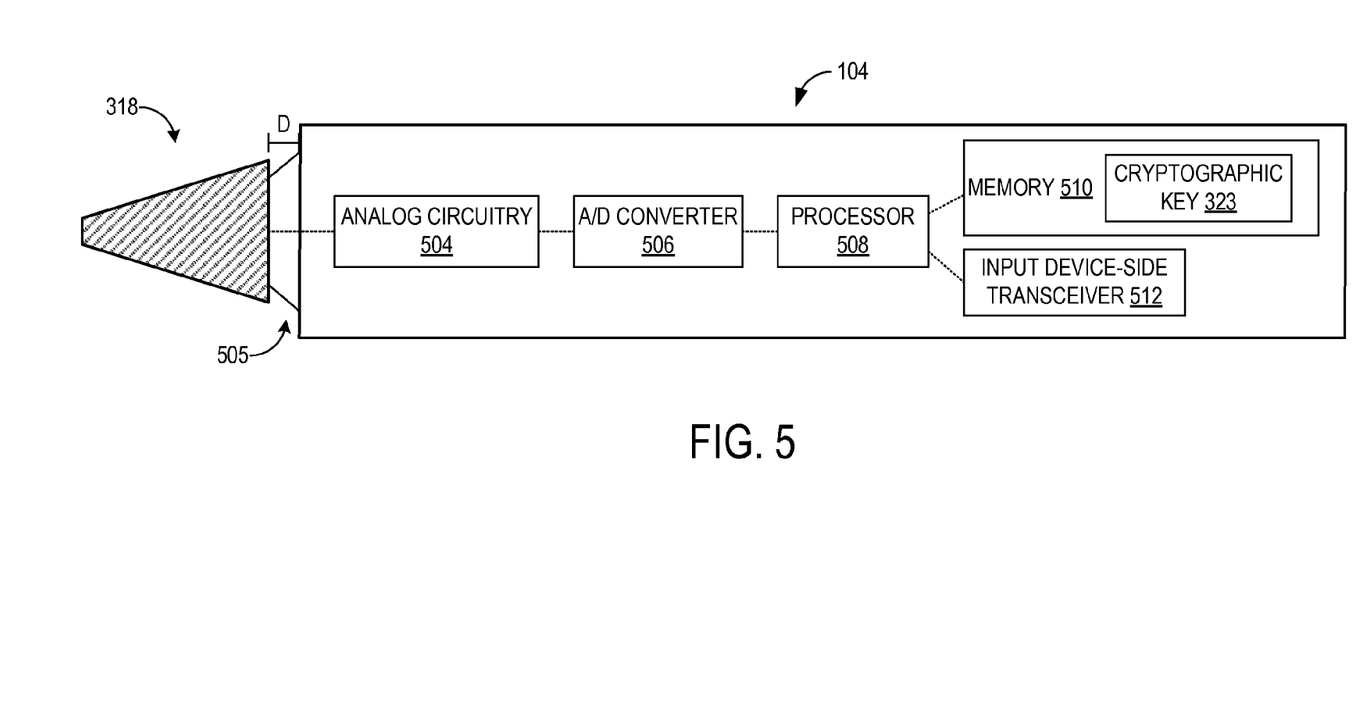
FIG. 5 shows an input device of the interactive display system of FIG. 1.

As alluded to above, interactive display system 100 may also communicate with styluses 104 via respective bidirectional radio channels 304 established between a display-side radio transceiver 320 and input device-side radio transceivers 512 shown in FIG. 5. Each of the radio channels 304 may be formed over a different channel from among a plurality of possible channels 321 used to communicate wirelessly between display-side transceiver 320 and input device-side transceivers 512, or over the same channel, but with each input device-side radio transceiver 512 assigned to a different timeslot within that channel.

As stylus 104 is first brought within range R of the display, the controller 314 of interactive display 102 is configured to communicate both channel information of the channel in use by display-side radio transceiver 320 and a synchronization pattern via an electrostatic channel 302. In particular, the electrode tip 318 of the stylus 104 and one or more proximate electrodes of electrode matrix 200 may form a capacitive coupling to capacitively send the information between the interactive display 102 and the stylus 104. Using this information, the stylus 104 is able to establish a radio channel 304 on the channel in use with the display-side transceiver, and is able to establish a shared sense of timing with the interactive display based on the synchronization pattern, which enables the stylus to accurately ascertain its Y (i.e., row) position based on changes in capacitance between the electrode tip and the nearest row electrode as the electrode matrix is driven in cycles.

Detected touch data 324 typically includes the X, Y data of the detected touch of the finger of a user. Program logic at the image source receives the detected input device data 322 and detected touch data 324 and performs programmatic processing to generate graphical output 108. The graphical output 108 is sent from the image source 312 to the controller 314, which in turn controls the light emitting layer 310 in a manner suitable to display the graphical output 108 on interactive display 102, as described above. In FIG. 3, the stylus 104 on the left is shown touching the display surface, depressing the electrode tip of the stylus, while the stylus 104 on the right is shown hovering with the electrode tip 318 in an undepressed state and positioned within range R.

Detected input device data 322 including the Y (row) position of the stylus 104 received via the radio channel 304 and the X (column) position of the stylus 104 sensed by the electrode matrix 200 is sent to the image source 312, along with any detected touch data 324 from a finger of the user. In addition to the X, Y (column, row) position of the stylus 104, the detected input device data 322 may include an indication of whether the electrode tip 318 is depressed or not. Other data may also be included in the detected input device data 322 such as a clock sync signal, a mode indication (write or erase), and an input device identifier, etc.

In some implementations, the exchange of different types of data between the interactive display and the stylus may be organized into different portions of a frame. In one example, a frame refers to a duration taken to complete one scan of the electrode matrix for applied inputs. The frame may be divided into a plurality of equally portioned time slots. Further, the frame may be divided into three or more different portions. A first portion of the frame may be devoted to sequentially driving row electrodes for purposes of establishing a Y position of the stylus and for purposes of determining the X and Y position of finger touches.

A second portion of the frame may be devoted to detecting excitation of the stylus electrode for the purposes of determining the X position of the stylus. Note that the electrode matrix may not excite the row electrodes during the second portion of the frame. Generally, a number of time slots in the second portion may be substantially less than a number of time slots in the first portion.

A third portion of the frame may be devoted to sending information other than position information either from the interactive display to the stylus or from the stylus to the interactive display. Example information that may be passed during the third portion of the frame may include timing synchronization information, radio channel information, and secure communication information. In one particular example, a cryptographic key is capacitively sent over the electrostatic channel during the third portion of a frame (or during the third portion of multiple frames).

The capacitive coupling between the electrode tip 318 of the stylus 104 and the electrode matrix 200 may be used to send a cryptographic key 323 between the interactive display 102 and the stylus 104. The cryptographic key 323 may be used to encrypt subsequent communications between the stylus 104 and the interactive display 102 over the radio channel 304. In one example, such encrypted communications include position information of the stylus 104. In another example, the encrypted communications include an upgraded version of firmware to be installed on the stylus 104. Any suitable information may be included in encrypted communications between the interactive display 102 and the stylus 104.

In some implementations, the cryptographic key may be sent during designated time slots of a frame during which position information is exchanged via capacitive coupling between the electrode tip and the electrode matrix. In particular, the cryptographic key may be sent during time slots designated for transmission of data other than position data, as discussed above. In some implementations, the cryptographic key may be sent responsive to an interrupt or trigger event. For example, the position sensing routine performed by the electrode matrix may be interrupted to send the cryptographic key.

In some implementations, the cryptographic key 323 includes a symmetric key. For example, a symmetric-key cryptographic algorithm, such as, AES, or a hash function like SHA-2 may be used to implement the symmetric key. Any suitable algorithm may be used to implement the symmetric key.

In the symmetric key implementation, a single secret may be shared between the stylus and the interactive display in order to encrypt subsequent communications. As such, the secret must therefore be present within the stylus itself, which renders that secret accessible to reverse-engineering. A system may take steps to make that reverse-engineering more difficult (e.g., by holding the secret only in on-chip memory in the same microprocessor that computes the signature), but by reverse-engineering a single stylus, security for all styluses in that system may be compromised because the styluses may use the same symmetric key.

Furthermore, transmitting a symmetric key over the air (e.g., via a radio channel) typically may expose the symmetric key to being intercepted by a malicious device without the malicious device being in close proximity to the interactive display and/or the stylus. In particular, because an eavesdropping range of a radio channel may be substantially greater than an eavesdropping range of an electrostatic channel, a malicious device may be able to intercept the symmetric key from a greater distance.

Accordingly, the symmetric key may be sent via a capacitive coupling between electrodes of the interactive display and the stylus to significantly reduce an eavesdropping range, so that the symmetric key may be sent in a manner that is more secure relative to sending the symmetric key over a radio channel.

Moreover, in some implementations, as a further measure of security, a new version of the symmetric key may be randomly generated each time a trigger event occurs to reduce the likelihood of a malicious device from reverse-engineering a usable symmetric key. In one particular example, a new symmetric key may be randomly generated each time upgraded firmware is to be installed on the stylus. In another example, a new symmetric key may be randomly generated after a designated period of time, such as once per day, or another duration. Any suitable event may trigger random generation of a new symmetric key to be passed between the stylus and the interactive display.

In other implementations, the cryptographic key 323 includes an asymmetric key. The asymmetric key may be send between the interactive display device and the input device via an electrostatic channel formed between one or more electrodes of the interactive display and an electrode tip of the input device. The asymmetric key may be used to encrypt communications that are subsequently sent between the interactive display device and the input device via the radio channel. In some implementations, the cryptographic key 323 may be generated by the interactive display 102 and sent to the stylus 104 via the electrostatic channel 302. In particular, drive electrodes of the electrode matrix 200 may be excited to capacitively send the cryptographic key 323 to the stylus 104. The drive electrodes transmit data by using a time-varying excitation voltage which in turn produces a time-varying detected current which is processed- to extract a digital signal (e.g., the cryptographic key).

In some implementations, some or all drive electrodes of the electrode matrix may be excited to transmit the cryptographic key. Using such an approach may make it more difficult to for a malicious device to intercept the cryptographic key relative to transmitting the cryptographic key over the radio channel. However, the electric field created by exciting all drive electrodes of the electrode matrix may create a measurable electric field at some distance (e.g., tens of feet).

Accordingly, in some implementations, to decrease the size of the electric field in which the cryptographic key is transmitted, the position of the stylus relative to the electrode matrix may be used to designate specific drive electrodes of the electrode matrix to transmit the cryptographic key to the stylus. In particular, the cryptographic key may be sent by exciting a subset of electrodes of the electrode matrix. The subset of electrodes may be selected based on the position of the electrode tip of the stylus relative to the electrode matrix. By only exciting transmit electrodes that are in close proximity to the stylus, the electric field size may be reduced to inhibit a malicious device at some distance from the interactive display from observing the transmission.

In some implementations, the cryptographic key 323 may be generated by the stylus 104 and sent to the interactive display 102 via the electrostatic channel 302. The electrode in the stylus is much smaller than a display matrix row or column electrode. Given that the electric field is smaller when generated by the smaller point electrode on the stylus, it may be more difficult for a malicious attacker to eavesdrop relative to implementations where the interactive display transmits the cryptographic key to the stylus.

In some implementations, the stylus may transmit the cryptographic key in the form of a random pad to the interactive display via the electrostatic channel. Subsequently, the upgraded version of the firmware may be encrypted by combining the firmware with the random pad using a lossless operation (e.g., XOR), and the encrypted communication may be sent over the radio channel. Since the stylus knows the random pad, the stylus may decrypt the received information using the random pad to authenticate the firmware. In some implementations where the cryptographic key is a randomly generated symmetric key, the stylus may use analog electronics used to make its capacitance measurement to additionally measure environmental and semiconductor device noise as a source of true randomness for randomly generating the symmetric key.

In some implementations, to further decrease the probability of a malicious device from successfully eavesdropping when the stylus transmits the cryptographic key to the interactive display, the interactive display may be configured to randomly excite one or more electrodes of the electrode matrix to create a randomly noisy electric field. This may cause additional current to flow into a malicious device's measurement electrode to hide the signal transmitted by the stylus. In one example, the noise signal from the interactive display may be generated using a cryptographically secure random number generator.

In such a random noise implementation, the interactive display senses a capacitive signal from its touch sensor and extracts the cryptographic key from the capacitive signal by subtracting the random noise generated by the random excitation of the matrix electrodes. The interactive display has knowledge of the noise waveforms transmitted by the matrix electrodes, and thus can use this knowledge to filter out the noise and extract the cryptographic key sent by the stylus electrode. The malicious device does not know the waveforms, and thus is unable to differentiate the cryptographic key from the noise. As indicated above, security is even stronger when the noise is generated using a cryptographically secure random number generator.

In some implementations, the cryptographic key may be implemented using public-key cryptographic algorithms. In such an approach, a secret used to check a signature is different from a secret used to generate the signature. This means that a device itself does not contain information that can be used to generate valid signatures. As such, reverse-engineering the device to acquire the secret used to generate the signature may be inhibited. However, processing public-key algorithms may be resource-intensive, so much so that low-power microprocessors, such as a processor used in the stylus may not be able to process the public-key. As such, public-key algorithms may be used in implementations of input devices that have greater processing power than that of the stylus.

Although discussion of the interactive display has been generally directed to a large-format wall mounted display device. The interactive display may take any suitable form without departing from the scope of the present disclosure. For example, the interactive display may be included in a laptop computing device, a tablet computing device, or a smartphone computing device, among other forms of computing devices. In one example, the electrode tip of a stylus capacitively couples with one or more electrodes of a display of a tablet computing device to form an electrostatic channel. The capacitive coupling between the electrode tip and the one or more electrodes of the display may be used to send a cryptographic key over the electrostatic channel in a secure manner (e.g., either from the stylus to the tablet or from the tablet to the stylus). Further, the capacitive coupling between the electrode tip and the one or more electrodes of the display may be used to determine a position of the electrode tip relative to the one or more electrodes of the display to determine a position of the stylus relative to the display.

Figure 4:
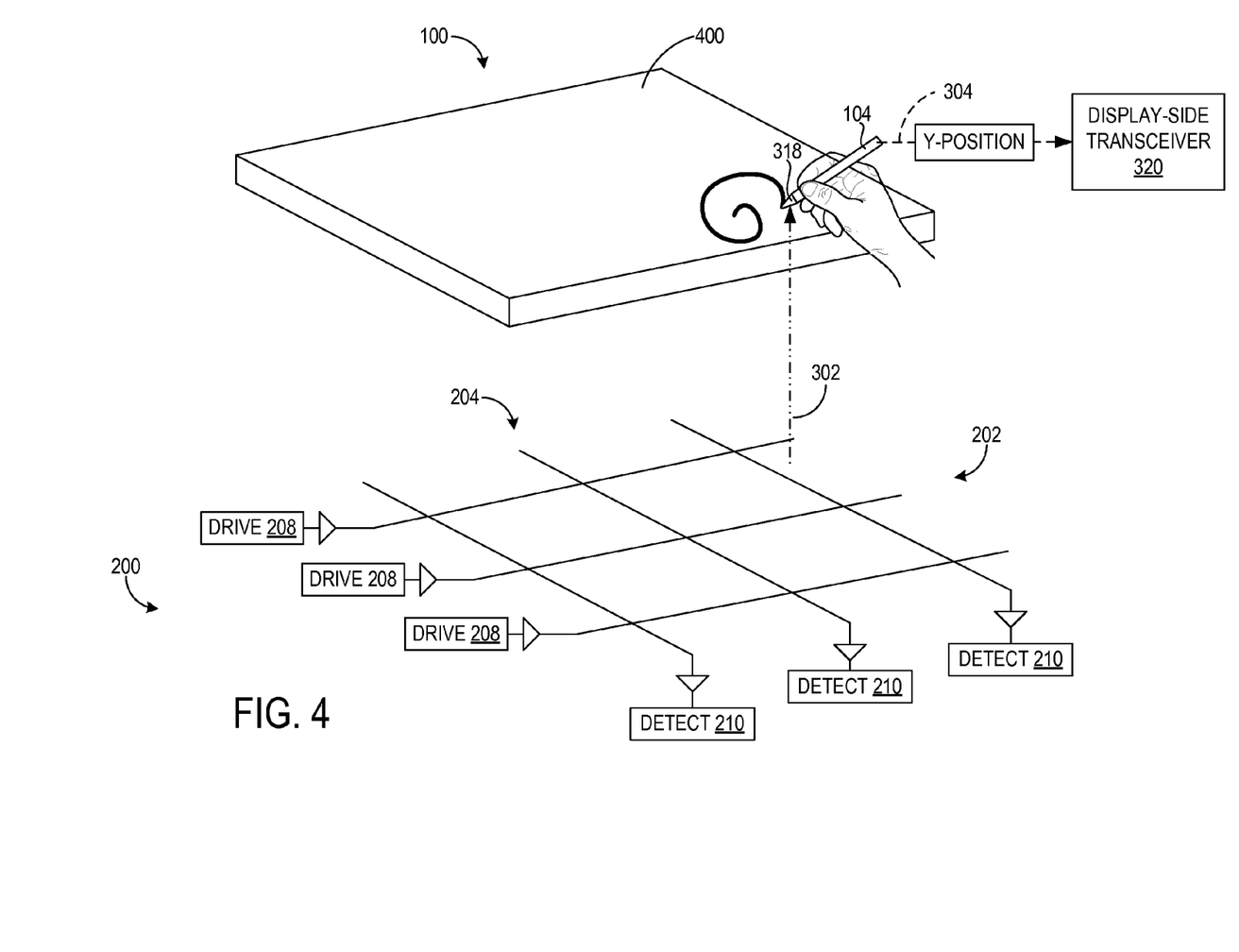
FIG. 4 shows an example transmission of data between the interactive display and a stylus of the interactive display system of FIG. 1.

FIG. 4 is a partial exploded view of interactive display system 100, illustrating how the interactive display system 100 establishes a communication link with stylus 104. In the exploded view, a surface 400 configured to display graphical output 108 and receive input from a finger of a user or from stylus 104 is shown. Surface 400 may be a top surface of a protective layer positioned above the plurality of row electrodes 202, for example. FIG. 4 also shows electrode matrix 200 positioned below surface 400 respective to a light emitting direction, with an electrostatic channel 402 formed between the electrode matrix and electrode tip 318 of stylus 104. The separation between surface 400 and electrode matrix 200 is exaggerated for the sake of illustration, and that the composition and placement of these components are not intended to be limiting in any way.

In some implementations, drive circuits 208 of electrode matrix 200 may be driven by a microcoded state machine implemented within a field-programmable gate array (FPGA) which forms part of controller 314, for example. Each drive circuit 208 may be implemented as a shift register having one flip-flop and output for each row electrode, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. If the shift register is used in this fashion, the output voltage may take on only two values. In other implementations, other circuitry may be used to permit the output voltage to take on a greater range of values, for example to reduce the harmonic content of the output waveforms and decrease the emissions radiated by interactive display system 100.

Stylus 104 may detect position signals as the plurality of row electrodes 202 are sequentially driven to thereby determine at least a portion of its position relative to interactive display system 100. In particular, electrode tip 318 of stylus 104 may receive a different current during the phases in which each row electrode in the plurality of row electrodes 202 is successively driven. The highest received current may indicate a row electrode nearest electrode tip 318, for example. In addition, stylus 104 may detect other signals via electrode tip 318 produced by operating the shift registers in the manner described above.

Having detected position signals, stylus 104 may transmit data regarding at least a portion of its position relative to interactive display system 100 via radio channel 304 established between display-side radio transceiver 320 and an input device-side radio transceiver, shown at 512 in FIG. 5. Transmission over radio channel 304 may occur on a predetermined radio channel, which may be one of a plurality of radio channels in a predetermined radio frequency hopping sequence. Channel identifiers that identify a current radio channel for transmission via radio channel 304 may be transmitted to stylus 104 via electrostatic channel 302, as described in further detail below.

FIG. 5 shows an example stylus 104. As described above, stylus 104 includes an electrode tip 318 that is electrically conductive and configured to receive current when proximate to a driven electrode of the electrode matrix 200. As shown, tip 318 is operatively coupled to analog circuitry 504, which is configured to convert currents received at the tip to corresponding voltages. Analog circuitry 504 may further include a voltage source configured to hold tip 318 at a constant voltage, or, during other modes of operation, apply time-varying voltages to the tip, as described in further detail below.

In some implementations, electrode tip 318 may be a switchable tip including a depressible switch 505 configured to provide a first output if stylus 104 is in contact with a surface (e.g., depressed against surface 400) and a second output if the stylus is not in contact with a surface (e.g., not depressed). Output from switch 505 may then be relayed to the interactive display 102 via radio channel 304 so that hover input may be distinguished from contact input, that is, so that the interactive display 102 may determine whether stylus 104 is in contact with the surface 400 or not in contact but hovering over the surface 400 of the interactive display 102.

In some implementations, electrode tip 318 may be configured to measure force. Accordingly, tip 318 may generate an output in a range of outputs which indicates the force sensed by the tip. As shown in FIG. 5, tip 318 is spaced away from the body of the stylus 104 by a distance D, which may be reduced as the tip is depressed. The tip may be biased outward by a spring, and the degree to which the distance D is closed may be sensed as a proxy of the force exerted on the tip.

Stylus 104 further includes an analog-to-digital (A/D) converter 506 operatively coupled to analog circuitry 504 and configured to digitize voltages received from the analog circuitry. As a non-limiting example, converter 506 may convert incoming electrostatic signals having bandwidths of 100 kHz at a sampling rate of 1 Mbit/s.

Stylus 104 further includes a processor 508 operatively coupled to A/D converter 506, memory 510, and an input device-side radio transceiver 512. Processor 508 is configured to process digitized signals from converter 506, execute instructions held in memory 510, and control input device-side transceiver 512. In some implementations, input device-side transceiver 512 may be configured to transmit and receive signals having frequencies between 2.4 GHz and 2.5 GHz, for example, and may be operatively coupled to processor 508 via a synchronous serial port.

To pair stylus 104 with the interactive display 102 and establish the radio channel 304 on an appropriate channel, the controller 314 of interactive display 102 may communicate a radio channel in use via the electrode matrix 200, by driving the electrode matrix in a way that encodes the radio channel information in a portion of the driven signal, as discussed below. The stylus 104 may electrostatically receive the radio channel identifier, along with a synchronization pattern, via electrode tip 318 from electrode matrix 200, via the electrostatic channel 302. Processor 508 may then execute instructions stored in memory 510 to retrieve a radio frequency from a table or other suitable data structure stored in the memory based on the radio channel identifier transmitted from electrode matrix 200. Stylus 104 may then transmit data via radio channel 304 formed between input device-side transceiver 512 and display-side radio transceiver 320 at the retrieved radio frequency, for example. In this way, the stylus may transmit position information, such as the row position (Y coordinate) of the stylus relative to the electrode matrix 200, from the stylus to the interactive display via the radio channel, as described in detail with reference to FIG. 6.

In some implementations, the stylus 104 may be configured to generate a cryptographic key 323. The stylus 104 may be configured to excite the electrode tip 318 so as to capacitively send the cryptographic key from the stylus to the proximate interactive display via capacitive coupling of the electrode tip of the stylus with one or more sense electrodes of the electrode matrix of the interactive display. The stylus may be further configured to subsequently exchange encrypted communications with the interactive display over the radio channel. The encrypted communications may be encrypted using the cryptographic key.

Figure 6:
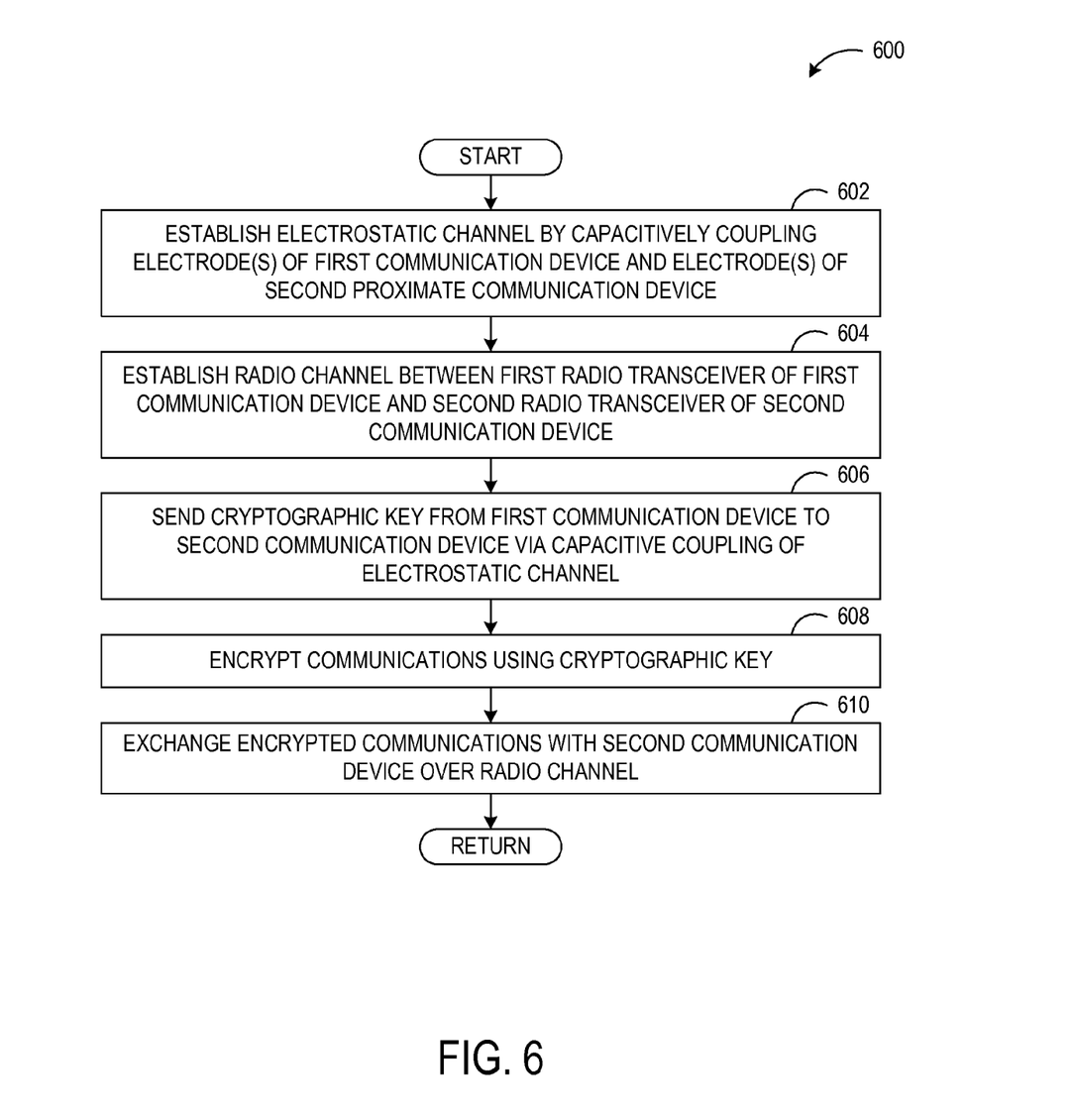
FIG. 6 shows an example method of transmitting a cryptographic key between an interactive display and an input device via an electrostatic channel.

FIG. 6 shows an example method 600 of transmitting information between a first communication device and a second communication device from an interactive display to an input device. The method 600 may be implemented in interactive display system 100, for example, and used to transmit a cryptographic key between the interactive display 102 and the stylus 104 via electrostatic channel 302 and radio channel 304 established therebetween.

At 602, the method 600 may include establishing an electrostatic channel by capacitively coupling one or more electrodes of the first communication device and one or more electrodes of a second communication device proximate to the first communication device. In one example, one or more row electrodes of the electrode matrix of the interactive display may be sequentially driven during a frame. For example, the row electrodes may be sequentially driven during an input detection mode in order to detect touch input and stylus input applied at or above the interactive display. In another example, the stylus may excite an electrode tip, and a detect circuit of the interactive display may detect a change in capacitance of a column electrode. In either example, an electrostatic channel may be formed between electrode(s) of the interactive display and the electrode tip of the stylus. The electrostatic channel may be used to capacitively send information between the interactive display and the stylus.

At 604, the method 600 may include establishing a radio channel between a first radio transceiver of the first communication device and a second radio transceiver of the second communication device. In one example, synchronization and channel identifier information may be transmitted from the interactive display to the stylus over the electrostatic channel. The synchronization information may be used to synchronize timing between the stylus and the interactive display. The channel identifier information may identify a radio channel on which data may be transmitted between the stylus and interactive display.

At 606, the method 600 may include sending a cryptographic key from the first communication device to the second communication device via capacitive coupling of one or more electrodes of the first communication device and one or more electrodes of the second communication device. In one example, the interactive display sends the cryptographic key to the stylus over the electrostatic channel. In another example, the stylus sends the cryptographic key to the interactive display over the electrostatic channel.

In some implementations, the cryptographic key may be a symmetric key. Further, in some implementations, a new version of the symmetric key may be randomly generated each time a trigger event occurs. In one example, each time an upgraded version of firmware is to be installed on the stylus, a new symmetric key is randomly generated. In some implementations, the cryptographic key may be an asymmetric key.

In some implementations where the stylus sends the cryptographic key, the interactive display may be configured to randomly excite one or more electrodes of the electrode matrix while the input device is sending the cryptographic key to the interactive display. Such random excitation may create noise that conceals transmission of the cryptographic key, as described above. Further, the interactive display may be configured to sense a capacitive signal from the electrode matrix and extract the cryptographic key from the capacitive signal by subtracting the noise generated by the random excitation of the one or more electrodes from the capacitive signal.

At 608, the method 600 may include encrypting communications between the first communication device and the second communication device using the symmetric key. In one example, encrypted communications may include an upgraded version of firmware for the stylus. In another example, encrypted communications may include stylus position information. Any suitable communications between the interactive display and the stylus may be encrypted using the symmetric key.

At 610, the method 600 may include exchanging encrypted communications with the second communication device over the radio channel formed between the first radio transceiver of the first communication device and the second radio transceiver of the second communication device.

The above described method may be performed to pass a cryptographic key between an interactive display and a stylus in a manner that is difficult for an eavesdropping device to tamper with the system or acquire the cryptographic key. In particular, by capacitively sending the cryptographic key between electrodes of the interactive display and the stylus, an electric field generated from excitation of the electrodes may be small relative to transmission over a radio channel. As such, a malicious device would have to be close to the interactive display in order to even detect the signal. Accordingly, a cryptographic key may be transmitted in a manner that is more secure relative other approaches.

Moreover, in some implementations, additional security measures may be taken to inhibit a malicious device from tampering with the system. For example, a new symmetric key may be randomly generated responsive to various trigger events to reduce the likelihood of the malicious device tampering with the system. As another example, in the case where the stylus transmits the cryptographic key to the interactive display, the interactive display may randomly generate noise while the stylus is transmitting in order to conceal the cryptographic key from the malicious device.

As discussed above, the methods and processes described herein may be implemented on the interactive display 102 with an external or internal image source 312, which is typically a computing device. The internal components of a computing device which may be used as image source 312 are illustrated in FIG. 7.

Figure 7:
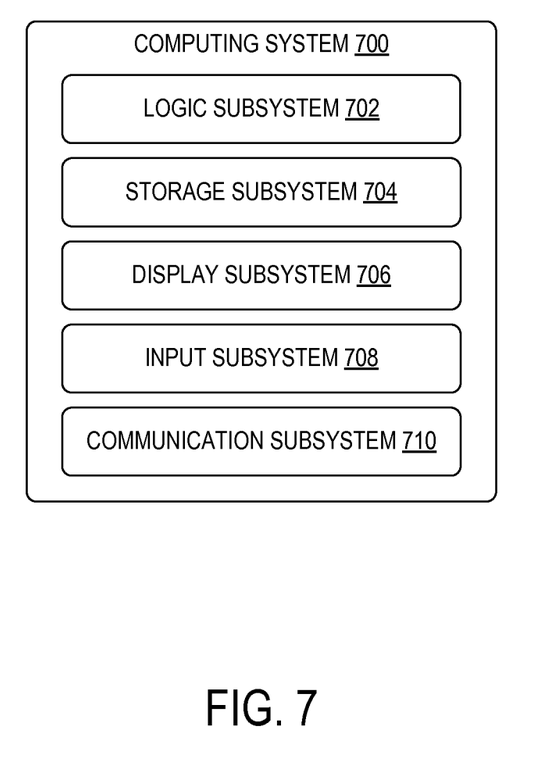
FIG. 7 shows an example computing device.

FIG. 7 schematically shows a non-limiting implementation of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage machine 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

Storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage machine 704 in a shared enclosure, or such display devices may be peripheral display devices.

When included, input subsystem 708 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 700 to send and/or receive messages to and/or from other devices via a network such as the Internet.

The configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interactive display device comprising:
a touch sensor including an electrode matrix having row electrodes and column electrodes, where the interactive display device is configured to excite one or more electrodes of the electrode matrix according to a repeated touch-sensing frame performed repeatedly to sense touch input to the touch sensor, the repeated touch-sensing frame being divided into a plurality of different portions each comprising one or more time slots, the plurality of different portions including a drive portion, a sensing portion, and an information sending portion, wherein the one or more electrodes form a capacitive coupling with an electrode tip of an input device, where the touch sensor uses the capacitive coupling between the electrode tip and the one or more electrodes of the electrode matrix to determine a position of the electrode tip relative to the electrode matrix during the sensing portion of the repeated touch-sensing frame, and where the interactive display device uses the capacitive coupling between the electrode tip and the one or more electrodes of the electrode matrix to capacitively send a cryptographic key via an electrostatic channel to the input device during the information sending portion of the repeated touch sensing frame; and
a radio transceiver configured to communicate via a radio channel, where the interactive display device is configured to subsequently exchange encrypted communications over the radio channel, the encrypted communications being encrypted using the cryptographic key.

2. The interactive display device of claim 1, where the cryptographic key is a symmetric key.

3. The interactive display device of claim 2, where a new version of the symmetric key is randomly generated each time a trigger event occurs.

4. The interactive display device of claim 3, where the trigger event includes at least one of a designated duration elapsing since a previous symmetric key was generated and the interactive display device receiving a new version of firmware for the input device.

5. The interactive display device of claim 1, where the cryptographic key is sent by exciting a subset of the one or more electrodes of the electrode matrix, the subset being selected based on the position of the electrode tip relative to the electrode matrix.

6. The interactive display device of claim 1, where the cryptographic key is an asymmetric key.

7. The interactive display device of claim 1, where the encrypted communications include an upgraded version of firmware for the input device.

8. The interactive display of claim 1, where the touch sensor is configured to determine a position of an additional touch input source different than the input device relative to the electrode matrix during the sensing portion of the repeated touch-sensing frame.

9. The interactive display of claim 1, where the cryptographic key is capacitively sent over the electrostatic channel during the information sending portion of multiple touch-sensing frames.

10. An input device configured to interact with an interactive display device, the input device comprising:
    an electrode tip configured to be excited to form a capacitive coupling with one or more electrodes an electrode matrix of a touch sensor of the interactive display device, where the interactive display device is configured to excite the one or more electrodes of the electrode matrix according to a repeated touch-sensing frame performed repeatedly to sense touch input to the touch sensor, the repeated touch-sensing frame being divided into a plurality of different portions each comprising one or more time slots, the plurality of different portions including a drive portion, a sensing portion, and an information sending portion, where the touch sensor uses the capacitive coupling between the electrode tip and the one or more electrodes to determine a position of the electrode tip relative to the touch sensor during the sensing portion of the repeated touch-sensing frame, and where the input device uses the capacitive coupling between the electrode tip and the one or more electrodes of the touch sensor to capacitively send a cryptographic key via an electrostatic channel to the interactive display device during the information sending portion of the repeated touch sensing frame; and
    a radio transceiver configured to communicate via a radio channel, where the input device is configured to subsequently exchange encrypted communications over the radio channel, the encrypted communications being encrypted using the cryptographic key.

11. The input device of claim 10, where the cryptographic key is a symmetric key.

12. The input device of claim 11, where a new version of the symmetric key is randomly generated each time a trigger event occurs.

13. The input device of claim 12, where the trigger event includes at least one of a designated duration elapsing since a previous symmetric key was generated and the interactive display device receiving a new version of firmware for the input device.

14. The input device of claim 10, where the encrypted communications include an upgraded version of firmware for the input device.

15. The input device of claim 10, where the interactive display is configured to randomly excite one or more electrodes of the electrode matrix while the input device is sending the cryptographic key to the interactive display.

16. The input device of claim 10, where the interactive display is configured to sense a capacitive signal from the touch sensor and extract the cryptographic key from the capacitive signal by subtracting noise generated by random excitation of the one or more electrodes of the electrode matrix from the capacitive signal.

17. The input device of claim 10, where the cryptographic key is sent by exciting a subset of the one or more electrodes of the electrode matrix, the subset being selected based on the position of the electrode tip relative to the electrode matrix.

18. A method for transmitting information between an interactive display device and an input device, the method comprising:
    repeatedly performing a touch-sensing frame to detect touch input to a touch sensor, the touch-sensing frame divided into a plurality of different portions each comprising one or more time slots, the plurality of different portions including a drive portion, a sensing portion, and an information sending portion;
    during the drive portion of the repeated touch-sensing frame, exciting one or more electrodes of an electrode matrix of the touch sensor of the interactive display device to send position information to the input device via a capacitive coupling between the one or more electrodes and an electrode tip of the input device;
    during the sensing portion of the repeated touch-sensing frame, sensing excitation of the electrode tip of the input device to receive position information from the input device via a capacitive coupling between the one or more electrodes and the electrode tip of the input device;
    during the information sending portion of the repeated touch sensing frame, sending a symmetric cryptographic key from the interactive display device to the input device via the capacitive coupling between the one or more electrodes of the interactive display device and the electrode tip of the input device; and
    subsequently exchanging encrypted communications with the input device over a radio channel formed between a first radio transceiver of the interactive display device and a second radio transceiver of the input device, the encrypted communications being encrypted using the symmetric cryptographic key.

19. The method of claim 18, where the interactive display is configured to randomly excite one or more electrodes of the electrode matrix while the input device is sending the symmetric cryptographic key to the interactive display.

20. The method of claim 19, where the interactive display is configured to sense a capacitive signal from the touch sensor and extract the cryptographic key from the capacitive signal by subtracting noise generated by random excitation of the one or more electrodes of the electrode matrix from the capacitive signal.

* * * * *